Oct. 17, 1933.  C. P. DE LORE  1,930,709
METHOD OF DRESSING BARYTES ORE
Filed May 2, 1931   7 Sheets-Sheet 5
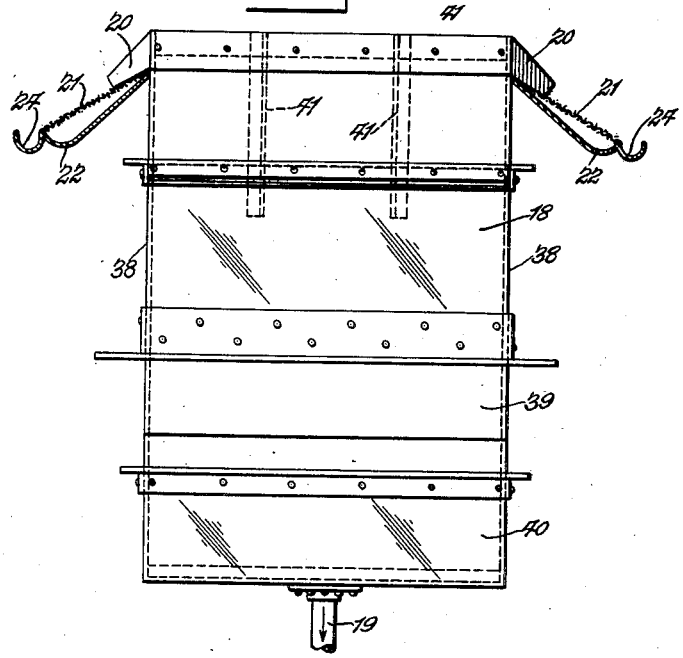
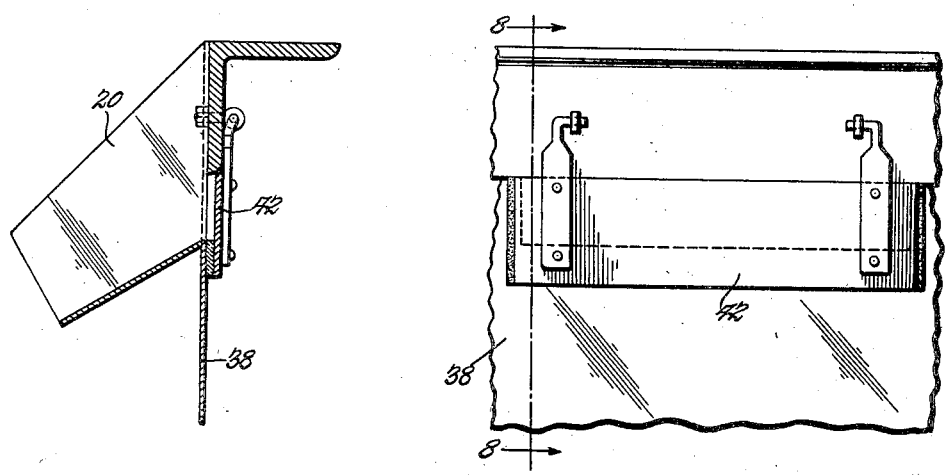

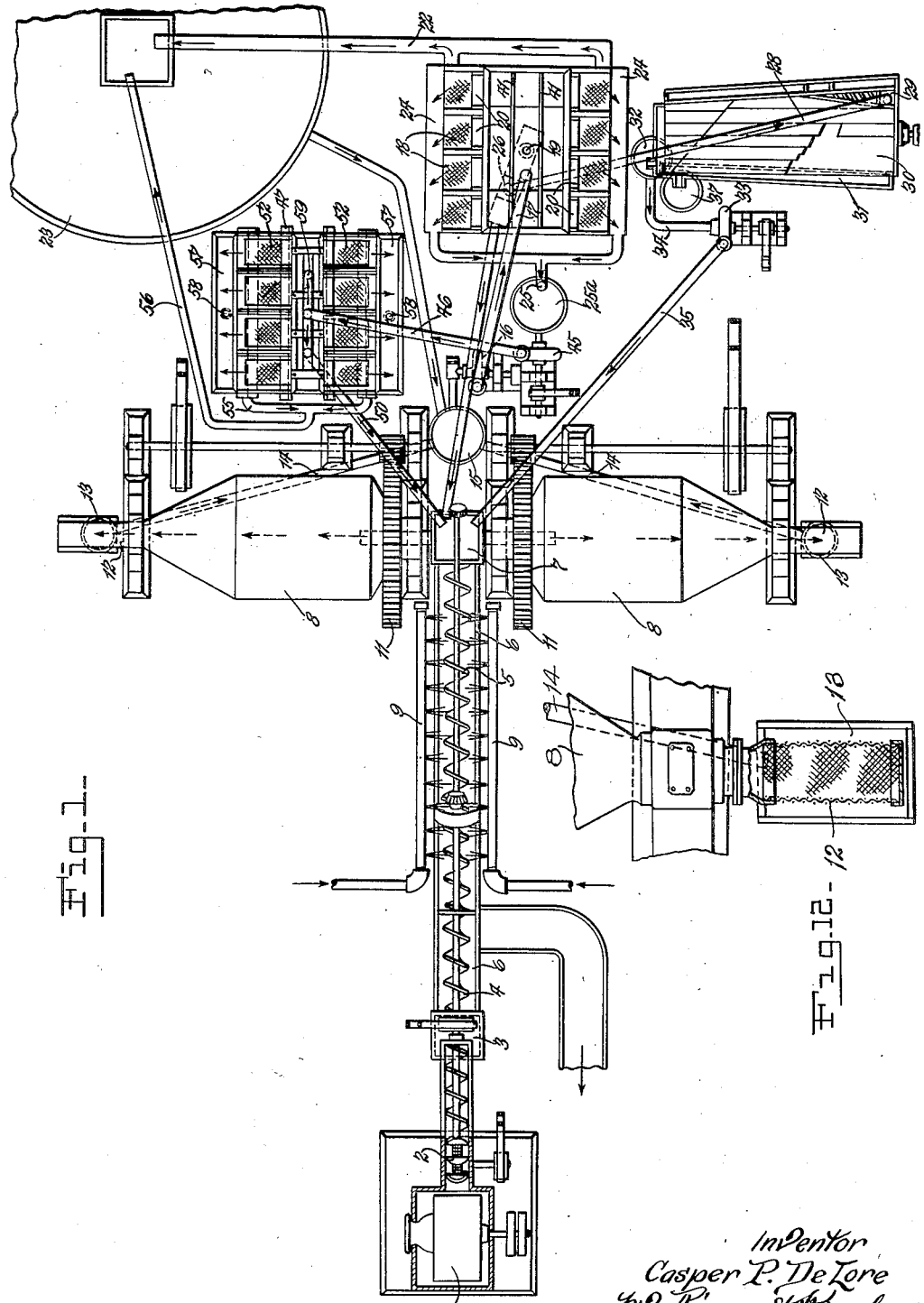

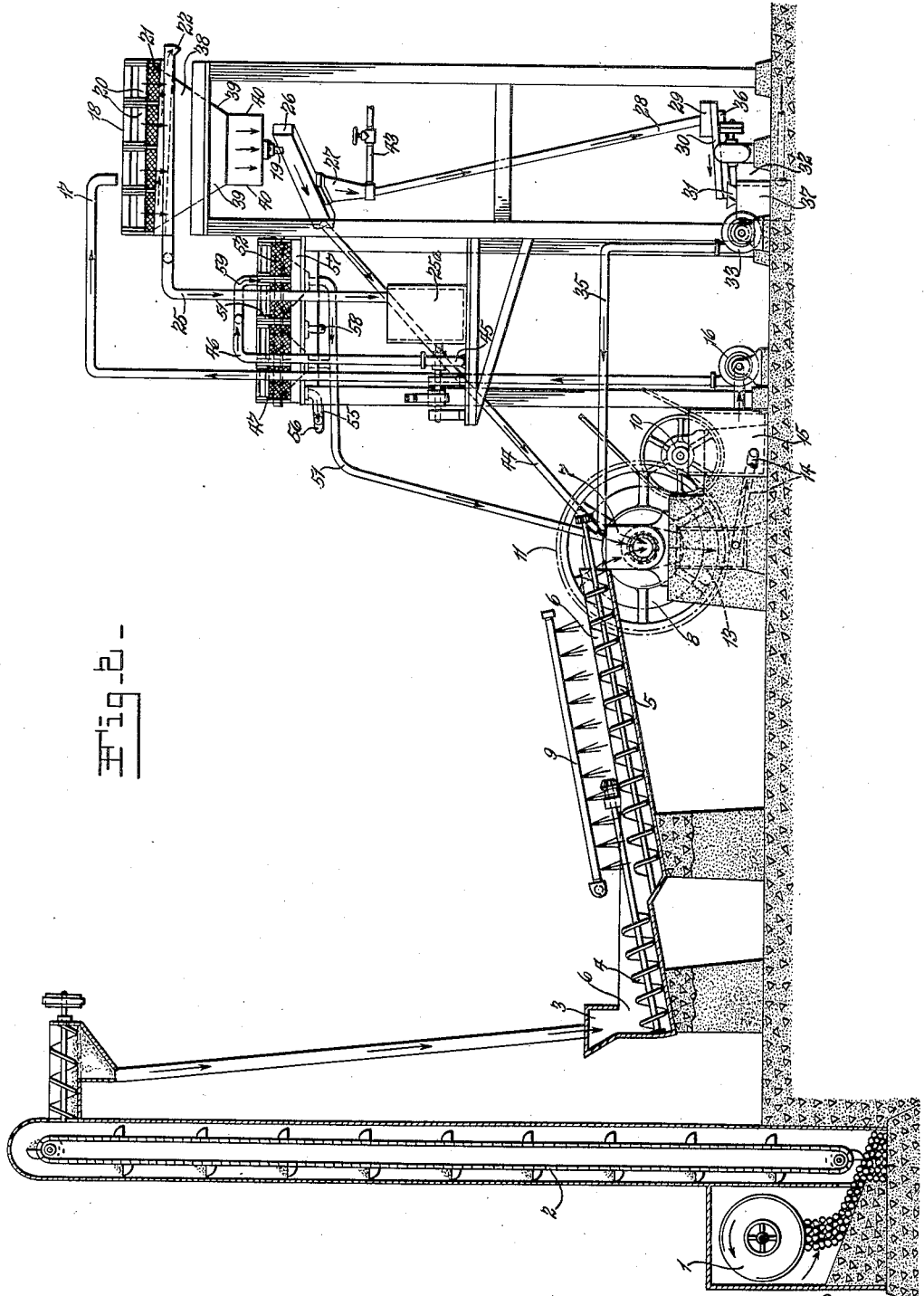

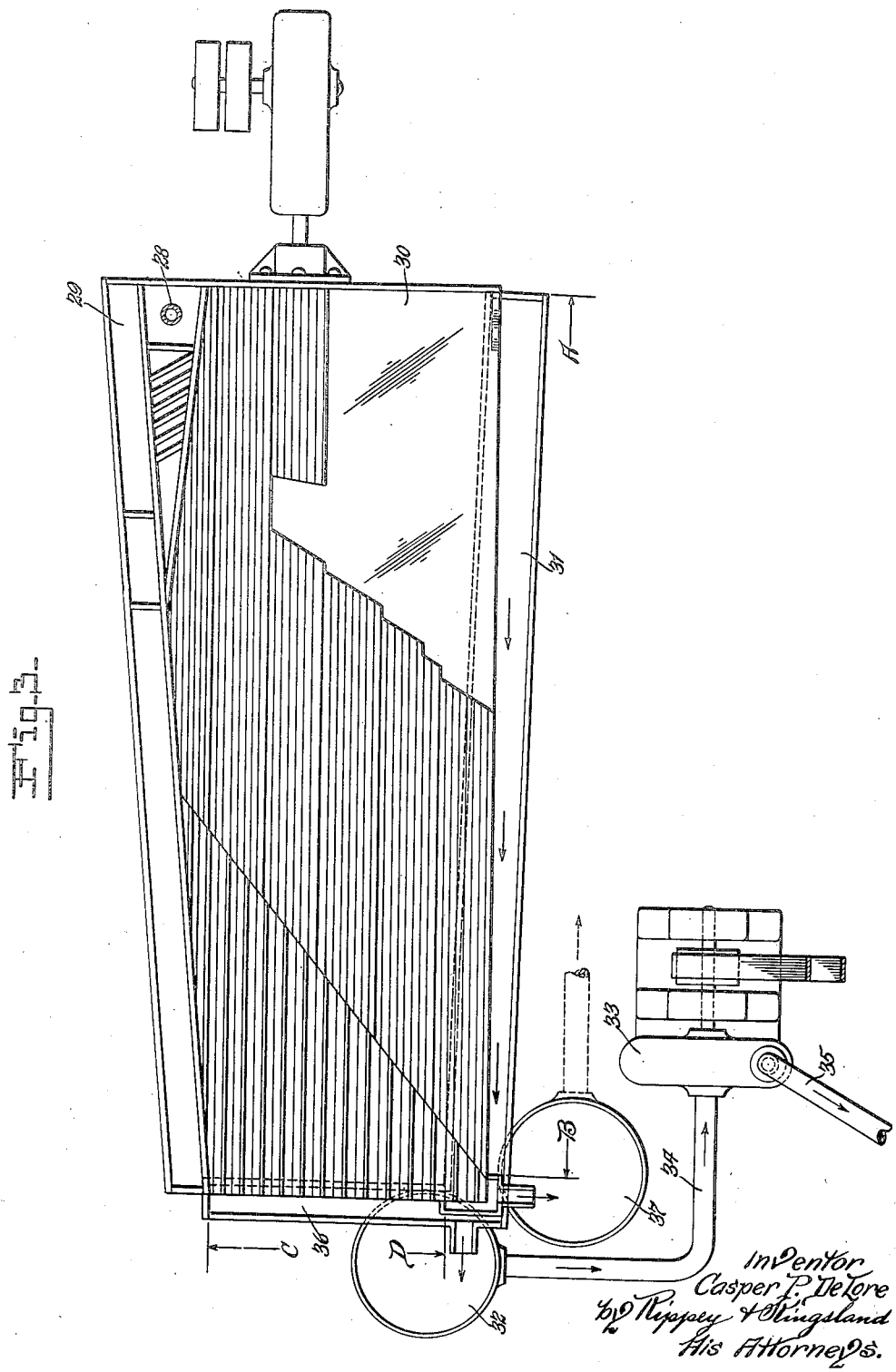

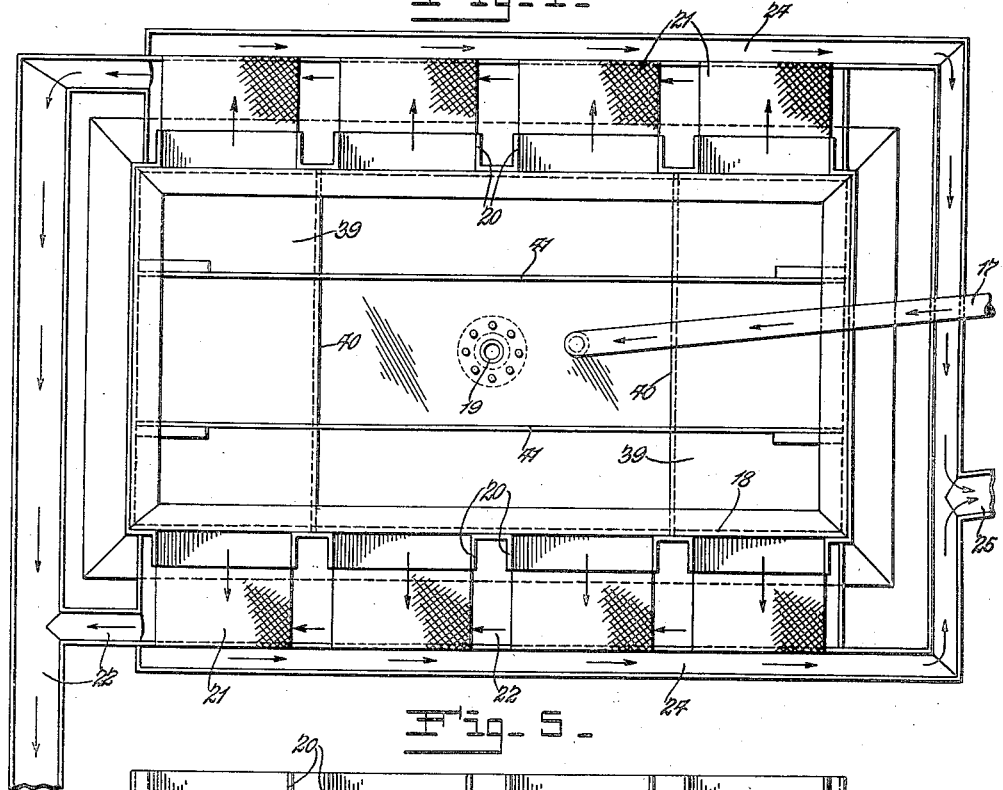

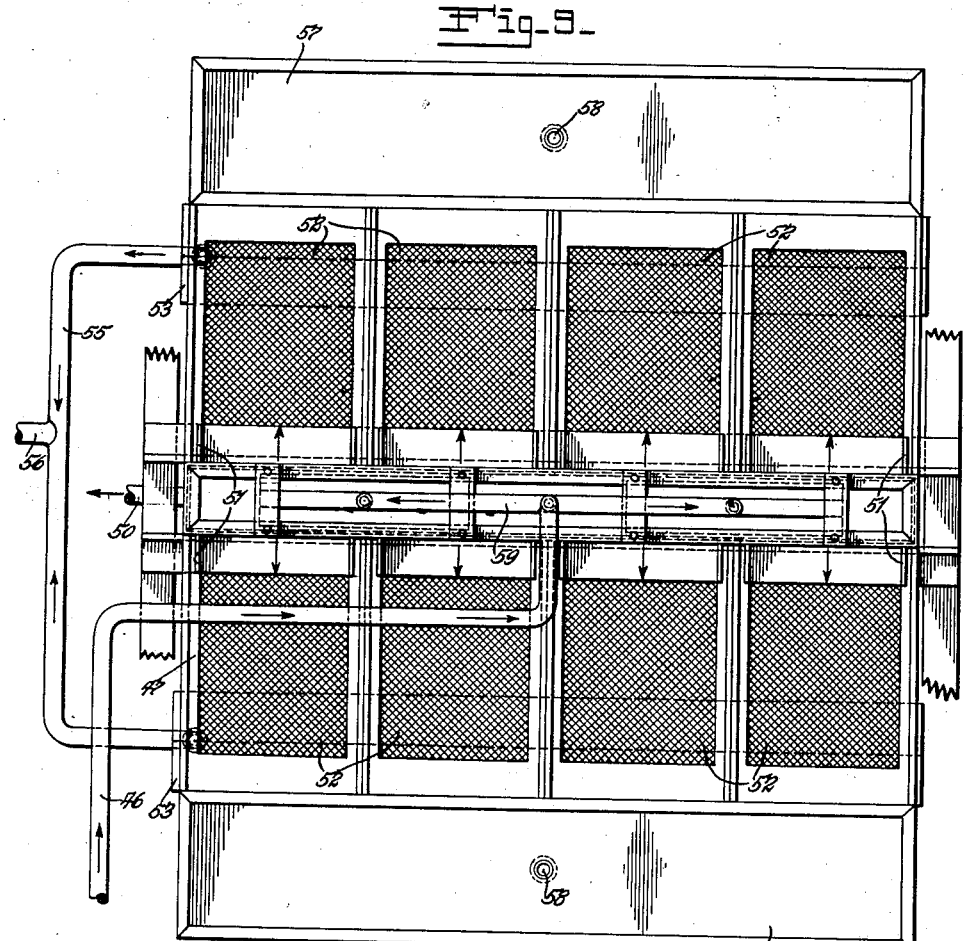
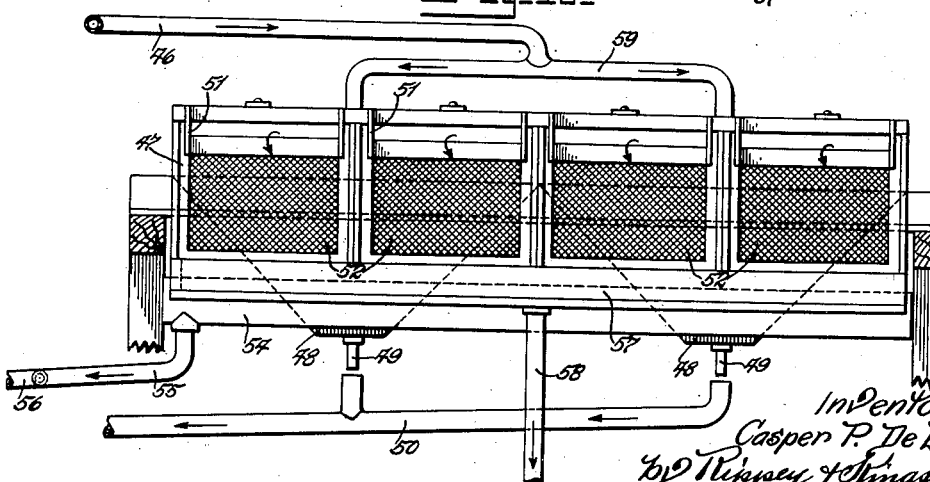

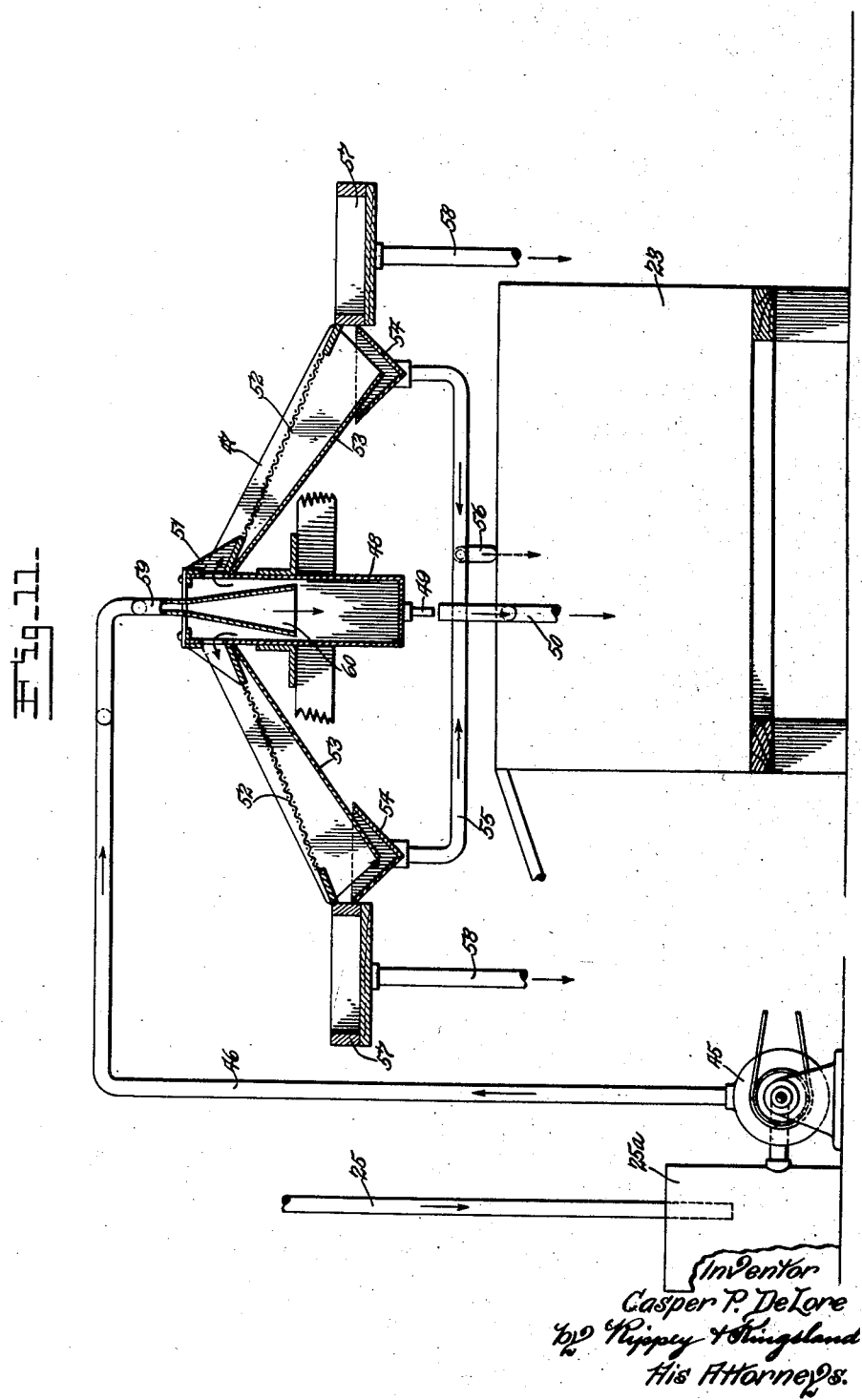

Patented Oct. 17, 1933

1,930,709

UNITED STATES PATENT OFFICE 1,930,709

METHOD OF DRESSING BARYTES ORE

Casper P. De Lore, Clayton, Mo., assignor to National Pigments & Chemical Company, St. Louis, Mo., a corporation of Missouri Application May 2, 1931. Serial No. 534,492

9 Claims. (Cl. 209—6)

This invention relates to the dressing of barium ore.

One object of the invention is to provide improved means for the continuous preparation of ore to secure a sludge containing particles only of a desired fineness.

Another object of the invention is to provide means for the mechanical removal of impurities in natural barytes ore and particularly for the removal of silica and iron.

Other objects will be apparent from the following detailed description.

Fig. 1 is a plan view of apparatus for practicing the invention.

Fig. 2 is a side elevation.

Fig. 3 is a plan view of the concentrator table.

Figs. 4 to 8, inclusive, are views of a water flotation separator; Fig. 4 being a plan view, Fig. 5 a side elevation, Fig. 6 an end elevation, Fig. 7 a detail from the interior, and Fig. 8 a cross section through lines 8—8, Fig. 7.

Figs. 9, 10 and 11 are views of a second water flotation separator; Fig. 9 being a plan view, Fig. 10 a side elevation, and Fig. 11 a vertical section.

Fig. 12 is a detail of the discharge end of a tube mill employed in practicing the invention.

Barium sulphate, a white compound, is found in nature mixed with considerable other compounds among which are principally iron compounds and silica. According to present practice, the ore is crushed and the iron compounds are reduced by cooking with a strong acid to dissolve soluble compounds and then washed out. Considerable silica is usually found in the ores and this material is undesirable because of its color and harshness.

By the process of this invention the ore is finely comminuted and passed through a number of steps of separation, the material of the desired fineness and purity being conducted to the treating tanks and the other material conducted back to the milling apparatus. A certain part of the material is subjected to a separating process which removes the silica and a part of the other impurities, especially concentrated iron particles.

Referring particularly to Figs. 1 and 2, the ore is fed to a crusher 1 from which it is conveyed by an elevator 2 for feeding in a hopper 3. Screw propellers 4 and 5 operating in washing troughs 6 convey the material to a hopper 7 where the material falls by gravity into tube mills 8. The material while in the troughs 6 is thoroughly mixed with water from pipes 9. The tube mills 8 are rotated by means of pinions 10 in mesh with gears 11 which are secured to the drum of the mill. The construction and operation of such tube mills are well known in the art, and need no further description. The material as ground is conducted from the mills through the spout 12 which consists of a cylindrical sieve permitting the exit of fine material only. It is to be understood, however, that a sieve fine enough to permit the exit of the material only which is suitable for the refining tank is not practicable, but a large part of the material ejected from the spout is suitable for such a treatment and after proper separation, as will hereafter be described, is conducted to the refining tank and the other part is conducted back to the mills for further comminution.

The material which passes through the spout 12 falls into a receptacle 13 whence it is conducted by a conduit 14 to a tank 15. A centrifugal pump 16 withdraws the material from the tank 15 and passes it through a pipe 17 to a water flotation separator 18. The construction of the separator 18, which will later be described in detail, is such as to permit the larger particles to fall to the bottom and out through a bottom orifice 19. The materials in suspension pass over the lips 20 onto bolting cloths 21 and the finer materials fall through the cloth into the trough 22 to be conducted to a storage tank 23. That part of the material which passes over the lips 20 and does not pass through the bolting cloths 21 passes into troughs 24 and is conveyed through a pipe 25 to a tank 25a whence it is subjected to further treatment which will be later described in detail.

The coarser materials which pass out of the orifice 19 drop into a launder 26 which has its bottom in communication with a cone baffle classifier 27 which separates the coarser material from the finer and passes the coarser material through the bottom into a pipe 28. The pipe 28 empties into a feed trough 29 of a classifying table 30. The arrangement of the table is such that the finer materials substantially free from silica pass off the table between the points A and B whence they pass into a trough 31 which empties into a receptacle 32. A certain amount of the coarser materials pass over the end of the table between the points C and D into a trough 36 which also empties into the receptacle 32. The receptacle 32 is emptied by a pump 33 through a pipe 34 and the contents are deposited through a pipe 35 into the hopper 7. The impurities sought to be removed pass off the table between the points B and D in a comparatively small space and are conveyed to a receptacle 37. These impurities consist largely of silica and the more concentrated iron compounds.

The separator 18 includes a box having vertical side walls 38, and inclined end walls 39, terminating in vertical bottom portions 40. Vertical baffles 41 are placed lengthwise of the box and the input pipe 17 is arranged to empty into the separator intermediate the two baffles. The exit to each of the lips 20 is provided with a hinged gate 42, thus permitting the use of as many lips as desired. It will readily be seen that the finer materials will be held in suspension and overflow onto the lips 20, whereas the coarser materials will settle to the bottom of the box and pass out through the pipe 19. It will be obvious, of course, that the pipe 19 is much smaller in size than the stream of water flowing into the separator from the pipe 17.

The cone baffle classifier 27 is of the hindered settling type and is arranged to receive a supply of water from a pipe 43, the interior being arranged with baffles in such a manner as to direct upwardly the stream of water received from the pipe 43 and permit the downward movement of the coarser particles in a zig-zag path. By this arrangement the coarser particles will pass through the classifier at the bottom and into the pipe 28, whereas the finer particles will continue through the launder 26 which is in communication at its end with a pipe 44 emptying into the hopper 7. The classifier so described is of standard construction and well known in the art of dressing ores.

A centrifugal pump 45 is arranged and adapted to force the material from the tank 25a through a pipe 46 to a separator 47, which is adapted and arranged to remove certain undesirable impurities consisting principally of silica and iron which would not be removed on the classifying table 30.

The separator 47 includes a receptacle 48 which has openings 49 at its bottom communicating with a pipe 50 which leads to the hopper 7.

The receptacle 48 has over-flow lips 51 which project material flowing over them to bolting cloths 52. Material passing through the bolting cloths 52 is conducted by the troughs 53 to troughs 54 communicating with pipes 55 which are connected by a pipe 56 leading to the storage tank 23.

Troughs 57 are arranged to collect the material passing over the bolting cloths 52. This material consists of impurities, principally silica and iron, and is wasted through pipes 58.

The pipe 46 discharges its material into the receptacle 48 through laterals 59 terminating in flaring nozzles 60 within the body of the receptacle 48.

While the operation of the device will be apparent from the foregoing description, for the sake of clarity, a recapitulation will be made. The commercial ore is fed to the crusher 1, whence it is conveyed by an elevator 2 for feeding in the hopper 3. Screw propellers 4 and 5 operating in washing troughs 6 convey the material to the hopper 7 of the tube mills 8. The material from the tube mills 8 falls into receptacle 13 whence it is conducted by conduit 14 to a tank 15. A centrifugal pump 16 withdraws the material from the tank and passes it from the water flotation separator 18. The finest material passes through bolting cloths 21 and is conducted by the troughs 22 to a storage tank 23 after which the material is subjected to a chemical treatment with which this invention is not concerned.

The coarser material separated by the separator 18 drops through the orifice 19 into a launder 26 whence it is subjected to treatment in a classifier 27 which passes the coarser material through a pipe 28 to a classifying table 30. The finer material secured from the classifier 27 passes through a pipe 44 to the hopper 7 of the tube mills for further comminution. The table 30 removes the impurities consisting principally of silica and iron between the points B and D and the remaining material is passed by the pump 33 through the pipe 35 to the hopper 7.

The material passing over the bolting cloths 21 of the separator 18 is conducted by the pipe 25 to a tank 25a whence it is conveyed to a separator 47. The coarser material from the separator 47 issuing from the orifice 49 is conducted through a pipe 51 to the hopper 7. The material passing through the bolting cloths 52 of the separator 47 is conveyed through pipe 56 to the storage tank 23 and the material passing over the bolting cloths 52 consists of impurities and is wasted.

The arrangement is such that substantially all the silica and a large amount of the other impurities, principally iron, is removed from the classifying table 30 between the points B and D and from the bolting cloths 52 of the separator 47.

It will thus be seen that the invention accomplishes its objects. The silica in the ore which is not amenable to treatment by the usual chemical processes is substantially removed and a large part of the more concentrated impurities, principally iron, which is obstinate to the chemical treatment is also removed. This results in a final product which is much superior to that now obtained. At the same time means have been provided for the continuous preparation of ore producing a sludge containing particles only of a desired fineness, the other particles being passed back through the system for further preparation.

It is obvious that parts of the invention may be used without the whole, and that various changes may be made in the details, within the scope of the appended claims, without departing from the spirit of this invention.

I claim:

1. The method of dressing barytes ore which includes as steps, crushing the ore, further comminuting the ore in the presence of water, settling out the heavier particles, subjecting such heavier particles to a hindered settling, separating by gravity from the coarser particles secured from said hindered settling impurities lighter in specific gravity than barytes, and conveying the residue back to the comminuting means.

2. The method of dressing barytes ore comprising crushing the ore, further comminuting the ore in the presence of water, continuously conducting a stream of sludge secured from said comminuting means to a settling basin in such a manner as to overflow the basin, bolting the overflow, reserving the finer material from the bolting process, conducting the oversize material from the bolting process back to the comminuting means, separating by gravity from the heavier particles withdrawn from the bottom of the settling basin impurities differing in specific gravity from the barytes, and conveying the residue back to the comminuting means.

3. The method of dressing barytes ore comprising crushing the ore, further comminuting the ore in the presence of water, continuously conducting a stream of sludge secured from said comminuting means to a settling basin in such a manner as to overflow the basin, bolting the overflow, reserving the finer material from the bolting process, conducting the oversize material from the bolting process back to the comminuting means, subjecting the coarser particles to a hindered settling, conveying the finer particles from the hindered settling back to the comminuting means, and separating by gravity from the coarser particles obtained from the hindered settling impurities differing in specific gravity from barytes, and conveying the residue back to the comminuting means.

4. The method of dressing barytes ore which includes as steps, comminuting the ore in the presence of water, settling out the heavier particles, bolting the lighter material and rebolting such of the material as passes over the first bolting cloth, and wasting the material which passes over the second bolting cloth.

5. The method of dressing barytes ore which includes as steps, comminuting the ore in the presence of water, settling out the heavier particles, bolting the lighter materials, settling the material which passes over the bolting cloth, bolting the material again, and wasting the material passing over the second bolting cloth.

6. The method of dressing barytes ore which includes as steps, comminuting the ore in the presence of water, settling out the heavier particles, separating by gravity from said particles silica and other impurities, and separating from the lighter particles recovered in the said settling operation the coarser particles for the purpose of eliminating impurities in the ore.

7. The method of dressing barytes ore which includes as steps, comminuting the ore in the presence of water, settling out the heavier particles, separating by gravity from said particles silica and other impurities, bolting the lighter particles from the settling operation, settling the material which has passed over the bolting cloth, again bolting that part of said material remaining in suspension, and wasting the particles which pass over the second bolting cloth.

8. The method of dressing barytes ore which includes as steps, comminuting the ore in the presence of water, settling out the heavier particles, separating by gravity from said heavier particles impurities having a lighter specific gravity than barytes, reserving the remainder of said heavier particles for further comminution, separating from the lighter particles recovered in the said settling operation the coarser particles thereof, and wasting the same.

9. The method of dressing barytes ore which includes as steps, comminuting the ore in the presence of water, classifying the material by suspension and settling to obtain particles of commercial weight, bolting the said particles to eliminate the coarser particles comprising material of lighter specific gravity than barytes, further classifying the heavier material obtained in the first classification step, reserving the lighter material obtained in said second classification, and separating by gravity from the heavier materials obtained in said second classification step impurities of lighter specific gravity than barytes, and reserving the remainder from said separation for further comminution.

CASPER P. DE LORE.